United States Patent
Dai et al.

(10) Patent No.: US 11,755,883 B2
(45) Date of Patent: Sep. 12, 2023

(54) SYSTEMS AND METHODS FOR MACHINE-LEARNED MODELS HAVING CONVOLUTION AND ATTENTION

(71) Applicant: Google LLC, Mountain View, CA (US)

(72) Inventors: Zihang Dai, Cupertino, CA (US);
Hanxiao Liu, Santa Clara, CA (US);
Mingxing Tan, Newark, CA (US);
Quoc V. Le, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/827,130

(22) Filed: May 27, 2022

(65) Prior Publication Data
US 2022/0383069 A1    Dec. 1, 2022

Related U.S. Application Data

(60) Provisional application No. 63/194,077, filed on May 27, 2021.

(51) Int. Cl.
*G06N 20/00*    (2019.01)
*G06N 3/044*    (2023.01)
*G06N 3/063*    (2023.01)
*G06N 3/08*    (2023.01)

(52) U.S. Cl.
CPC ............. *G06N 3/044* (2023.01); *G06N 3/063* (2013.01); *G06N 3/08* (2013.01); *G06N 20/00* (2019.01)

(58) Field of Classification Search
CPC ...... G06N 3/0445; G06N 20/00; G06N 3/063; G06N 3/08
See application file for complete search history.

(56) References Cited

U.S. PATENT DOCUMENTS

2018/0253641 A1* 9/2018 Yachide ................... G06N 3/04

OTHER PUBLICATIONS

Duan et al., "MADNN: A Multi-scale Attention Deep Neural Network for Arrhythmia Classification", Sep. 2020, Computing in Cardiology 2020, pp. 1-4. (Year: 2020).*

(Continued)

*Primary Examiner* — Ying Yu Chen
(74) *Attorney, Agent, or Firm* — Dority & Manning, P.A.

(57) ABSTRACT

A computer-implemented method for performing computer vision with reduced computational cost and improved accuracy can include obtaining, by a computing system including one or more computing devices, input data comprising an input tensor having one or more dimensions, providing, by the computing system, the input data to a machine-learned convolutional attention network, the machine-learned convolutional attention network including two or more network stages, and, in response to providing the input data to the machine-learned convolutional attention network, receiving, by the computing system, a machine-learning prediction from the machine-learned convolutional attention network. The convolutional attention network can include at least one attention block, wherein the attention block includes a relative attention mechanism, the relative attention mechanism including the sum of a static convolution kernel with an adaptive attention matrix. This provides for improved generalization, capacity, and efficiency of the convolutional attention network relative to some existing models.

22 Claims, 6 Drawing Sheets

(56) References Cited

OTHER PUBLICATIONS

Bello et al., "Attention Augmented Convolutional Networks", 2019, 2019 IEEE/CVF International Conference on Computer Vision (ICCV), pp. 3285-3294. (Year: 2019).*
Li et al., "Revisiting Dynamic Convolution Via Matrix Decomposition", Mar. 15, 2021, arXiv:2103.08756v1, pp. 1-11. (Year: 2021).*
Su et al., "Concrete Cracks Detection Using Convolutional Neural Network Based on Transfer Learning", Oct. 17, 2020, Mathematical Problems in Engineering vol. 2020, pp. 1-10. (Year: 2020).*
Pendse et al., "Memory Efficient 3D U-Net with Reversible Mobile Inverted Bottlenecks for Brain Tumor Segmentation", Mar. 26, 2021, BrainLes 2020, LNCS 12659, pp. 388-397. (Year: 2021).*
Tan et al., "EfficientNet: Rethinking Model Scaling for Convolutional Neural Networks", Nov. 23, 2019, arXiv:1905.11946v3, pp. 1-10. (Year: 2019).*
Li et al., "Automatic Instrument Recognition in Polyphonic Music Using Convolutional Neural Networks", Nov. 17, 2015, arXiv:1511.05520v1, pp. 1-5. (Year: 2015).*
Bello et al., "Attention Augmented Convolutional Networks", arXiv:1904.09925v5, dated Sep. 9, 2020, 13 pages.
Bello, "Lambda Networks: Modeling Long-Range Interactions Without Attention", arXiv:2102.08602v1, dated Feb. 17, 2021, 31 pages.
Brock et al., "High-Performance Large-Scale Image Recognition Without Normalization", arXiv:2102.06171v1, dated Feb. 11, 2021, 22 pages.
Choromanski et al., "Rethinking Attention with Performers", arXiv:2009.14794v1, dated Sep. 30, 2020, 36 pages.
Cubuk et al., "Randaugment: Practical automated data augmentation with a reduced search space", Proceedings of the IEEE/CVF Conference on Computer Vision and Pattern Recognition (CVPR) Workshops, 2020, 10 pages.
Dai et al., "Funnel-Transformer: Filtering out Sequential Redundancy for Efficient Language Processing", arXiv:2006.03236v1, dated Jun. 5, 2020, 19 pages.
Dai et al., "Transformer-XL: Attentive Language Models Beyond a Fixed-Length Context", arXiv:1901.02860v3, dated Jun. 2, 2019, 20 pages.
Deng et al., "ImageNet: A Large-Scale Hierarchical Image Database", In 2009 IEEE conference on computer vision and pattern recognition, 2009, pp. 248-255.
Devlin et al., "BERT: Pre-training of Deep Bidirectional Transformers for Language Understanding", arXiv:1810.04805v1, dated Oct. 11, 2018, 14 pages.
Dosovitskiy et al., "An Image is Worth 16x16 Transformers for Image Recognition at Scale", arXiv:2010,11929v1, dated Oct. 22, 2020, 21 pages.
Graham et al., "LeViT: a Vision Transformer in ConvNet's Clothing for Faster Inference", arXiv:2104,01136v2, dated May 6, 2021, 16 pages.
Han et al., "A Survey on Visual Transformer", arXiv:2012,12556v1, dated Dec. 23, 2020, 21 pages.
He et al., "Deep Residual Learning for Image Recognition", In Proceedings of the IEEE conference on computer vision and pattern recognition, 2016, pp. 770-778.
He et al., "Identity Mappings in Deep Residual Networks", arXiv:1603.05027v3, dated Jul. 25, 2016, 15 pages.
Hendrycks et al., "Bridging Nonlinearities and Stochastic Regularizers with Gaussian Error Linear Units", arXiv:1606.08415v1, dated Jun. 27, 2016, 6 pages.
Hu et al., "Squeeze and Excitation Networks", arXiv:1709.01507v3, dated Oct. 25, 2018, 14 pages.
Huang et al., "Deep Networks with Stochastic Depth", arXiv:1603.09382v2, dated Apr. 4, 2016, 15 pages.
Huang et al., "Music Transformer: Generating Music with Long-Term Structure", arXiv:1809.04281v3, dated Dec. 12, 2018, 14 pages.
Kahn et al., "Transformers in Vision: A Survey", arXiv:2101.01169v4, dated Oct. 3, 2021, 30 pages.
Katharopoulos et al., "Transformers are RNNs: Fast Autoregressive Transformers with Linear Attention", arXiv:2006.16236v3, dated Aug. 31, 2020, 17 pages.
Krizhevsky et al., "ImageNet Classification with Deep Convolutional Neural Networks", Advances in neural information processing systems 25, 2012, pp. 1097-1105.
Liu et al., "Swin Transformer: Hierarchical Vision Transformer using Shifted Windows", arXiv:2103.14030v2, dated Aug. 17, 2021, 14 pages.
Loshchilov et al., "Fixing Weight Decay Regularization in Adam", arXiv:1711.05101v1, dated Nov. 14, 2017, 13 pages.
Mohamed et al., "A Data and Compute Efficient Design for Limited-Resources Deep Learning", arXiv:2004.09691v2, dated Jul. 8, 2020, 8 pages.
Raffel et al., "Exploring the Limits of Transfer Learning with a Unified Text-to-Text Transformer", arXiv:1910.10683v2, dated Oct. 24, 2019, 53 pages.
Ramachandran et al., "Stand-Alone Self-Attention in Vision Models", arXiv: 1906.05909v1, dated Jun. 13, 2019, 15 pages.
Sandler et al., "MobileNetV2: Inverted Residuals and Linear Bottlenecks", In Proceedings of the IEEE conference on computer vision and pattern recognition, 2018, pp. 4510-4520.
Schick et al., "It's not Just Size That Matters: Small Language Models are Also Few-Shot Learners", arXiv:2009.07118v1, dated Sep. 11, 2020, 11 pages.
Shaw et al., "Self-Attention with Relative Position Representations", arXiv:1803.02155v2, dated Apr. 12, 2018, 5 pages.
Sifre et al., "Rigid-Motion Scattering for Texture Classification", arXiv:1403.1687v1, dated Mar. 7, 2014, 19 pages.
Simonyan et al., "Very Deep Convolutional Networks for Large-Scale Image Recognition", arXiv:1409.1556v6, dated Apr. 10, 2015, 14 pages.
Srinivas et al., "Bottleneck Transformers for Visual Recognition", In Proceedings of the IEEE/CVF conference on computer vision and pattern recognition, 2021, pp. 16519-16529.
Sun et al., "Revisiting Unreasonable Effectiveness of Data in Deep Learning Era", arXiv:1707.02968v2, dated Aug. 4, 2017, 13 pages.
Szegedy et al., "Going Deeper with Convolutions", In Proceedings of the IEEE conference on computer vision and pattern recognition, 2015, pp. 1-9.
Szegedy et al., "Rethinking the Inception Architecture for Computer Vision", arXiv:1512.00567v3, dated Dec. 11, 2015, 10 pages.
Tan et al., "EfficientNet: Rethinking Model Scaling for Convolutional Neural Networks", In International conference on machine learning, PMLR, 2019, pp. 6105-6114.
Tan et al., "EfficientNetv2: Smaller Models and Faster Training", arXiv:2104.00298v3, dated Jun. 23, 2021, 11 pages.
Tan et al., "MnasNet: Platform-Aware Neural Architecture Search for Mobile", In Proceedings of the IEEE/CVF Conference on Computer Vision and Pattern Recognition, 2019, pp. 2820-2828.
Touvron et al., "Going deeper with Image Transformers", arXiv:2103.17239v2, dated Apr. 7, 2021, 30 pages.
Touvron et al., "Training data-efficient image transformers & distillation through attention", arXiv:2012,12877v1, dated Dec. 2020, 22 pages.
Tsai et al., "Transformer Dissection: A Unified Understanding of Transformer's Attention via the Lens of Kernel", arXiv:1908,11775v4, dated Nov. 11, 2019, 10 pages.
Vaswani et al., "Attention is all you Need", arXiv:1706,03762v5, dated Dec. 6, 2017, 15 pages.
Vaswani et al., "Scaling Local Self-Attention for Parameter Efficient Visual Backbones", arXiv:2103.12731v3, dated Jun. 7, 2021, 15 pages.
Wang et al., "Non-local Neural Networks", In Proceedings of the IEEE conference on computer vision and pattern recognition, 2018, pp. 7794-7803.
Wang et al., "Pyramid Vision Transformer: A Versatile Backbone for Dense Prediction without Convolutions", arXiv:2102.12122v2, dated Aug. 11, 2021, 15 pages.
Wu et al., "CvT: Introducing Convolutions to Vision Transformers", arXiv:2103.15808v1, dated Mar. 29, 2021, 10 pages.
Yuan et al., "Incorporating Convolution Designs into Visual Transformers", arXiv:2103.11816v2, dated Apr. 20, 2021, 10 pages.

(56) References Cited

OTHER PUBLICATIONS

Yuan et al., "Tokens-to-Token ViT: Training Vision Transformers from Scratch on ImageNet", arXiv:2101.11986v3 dated Nov. 30, 2021, 10 pages.
Zhai et al., "Scaling Vision Transfomers", arXiv:2106.04560v1, dated Jun. 8, 2021, 31 pages.
Zhang et al., "mixup: Beyond Empirical Risk Minimization", arXiv:1710.09412v1, dated Oct. 25, 2017, 11 pages.
Zhou et al, "Deep ViT: Towards Deeper Vision Transformer", arXiv:2103.11886v4, dated Apr. 19, 2021, 12 pages.
Zhuoran et al., "Efficient Attention: Attention with Linear Complexities", In Proceedings of the IEEE/CVF winter conference on applications of computer vision, 2021, pp. 3531-3539.
Heo et al., "Rethinking Spatial Dimensions of Vision Transformers", Proceedings of the IEEE/CVF International Conference on Computer Vision, 2021, pp. 11936-11945.
International Search Report and Written Opinion for Application No. PCT/US2022/031304, dated Sep. 12, 2022, 17 pages.
Park et al., "A Simple and Light-weight Attention Module for Convolutional Neural Networks", International journal of computer vision, vol. 128, No. 4, 2020, pp. 783-798.
Yan et al., "ConTNet: Why not use convolution and transformer at the same time?", arXiv.2104.13497v3, dated May 10, 2021, 12 pages.

\* cited by examiner

SYSTEMS AND METHODS FOR MACHINE-LEARNED MODELS HAVING CONVOLUTION AND ATTENTION

RELATED APPLICATIONS

This application claims priority to and the benefit of U.S. Provisional Patent Application No. 63/194,077, filed May 27, 2021. U.S. Provisional Patent Application No. 63/194,077 is hereby incorporated by reference in its entirety.

FIELD

The present disclosure relates generally to machine-learning. More particularly, the present disclosure relates to systems and methods for machine-learned models having convolution and attention.

BACKGROUND

Machine-learning refers to a class of learned algorithms that provide predictions over input data. Convolutional Neural Networks, or CNNs, are a class of machine-learned model that employs convolutional frames in a neural network. Transformers are a class of machine-learned model that employ an attention mechanism to weight distinct portions of input data. Existing approaches to combine convolution and attention face drawbacks such as increased computational cost.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for performing computer vision with reduced computational cost and improved accuracy. The computer-implemented method includes obtaining, by a computing system including one or more computing devices, input data including an input tensor having one or more dimensions. The computer-implemented method includes providing, by the computing system, the input data to a machine-learned convolutional attention network, the machine-learned convolutional attention network including two or more network stages, each of the two or more network stages including one of an attention stage or a convolutional stage. The computer-implemented method includes, in response to providing the input data to the machine-learned convolutional attention network, receiving, by the computing system, a machine-learning prediction from the machine-learned convolutional attention network. The attention stage includes a relative attention mechanism, the relative attention mechanism including the sum of a static convolution kernel with an adaptive attention matrix.

Another example aspect of the present disclosure is directed to a computer-implemented method for performing computer vision with reduced computational cost and improved accuracy. The computer-implemented method includes obtaining, by a computing system including one or more computing devices, input data including an input tensor having one or more dimensions. The computer-implemented method includes providing, by the computing system, the input data to a machine-learned convolutional attention network. The machine-learned convolutional attention network includes a downsampling stage configured to reduce a spatial resolution relative to the input tensor and one or more attention blocks including a relative attention mechanism, the relative attention mechanism including the sum of a static convolution kernel with an adaptive attention matrix. The computer-implemented method includes, in response to providing the input data to the machine-learned convolutional attention network, receiving, by the computing system, a machine-learning prediction from the machine-learned convolutional attention network.

Another example aspect of the present disclosure is directed to a computer-implemented method for performing computer vision with reduced computational cost and improved accuracy. The computer-implemented method includes obtaining, by a computing system including one or more computing devices, input data including an input tensor having one or more dimensions. The computer-implemented method includes providing, by the computing system, the input data to a machine-learned convolutional attention network, the machine-learned convolutional attention network including a plurality of network stages. The plurality of network stages includes an S0 stage including a two-layer convolutional stem network, an S1 stage including a convolutional block with squeeze-excitation, an S2 stage including a convolutional block, an S3 stage including a convolutional block, an S4 stage including an attention block, and an S5 stage including an attention block. Each of the S4 stage and the S5 stage include a relative attention mechanism including the sum of a static convolution kernel with an adaptive attention matrix. Spatial resolution is decreased at each of the plurality of network stages. A number of channels is increased at each of the plurality of network stages. The computer-implemented method includes, in response to providing the input data to the machine-learned convolutional attention network, receiving, by the computing system, a machine-learning prediction from the machine-learned convolutional attention network.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

The attached Appendices describe example implementations of the proposed techniques in greater detail. The attached Appendices are incorporated into and form a part of this disclosure. However, the present disclosure is not limited to the example implementations provided in the attached Appendices.

BRIEF DESCRIPTION OF THE DRAWINGS

Detailed discussion of embodiments directed to one of ordinary skill in the art is set forth in the specification, which makes reference to the appended figures, in which.

Figure 1A:
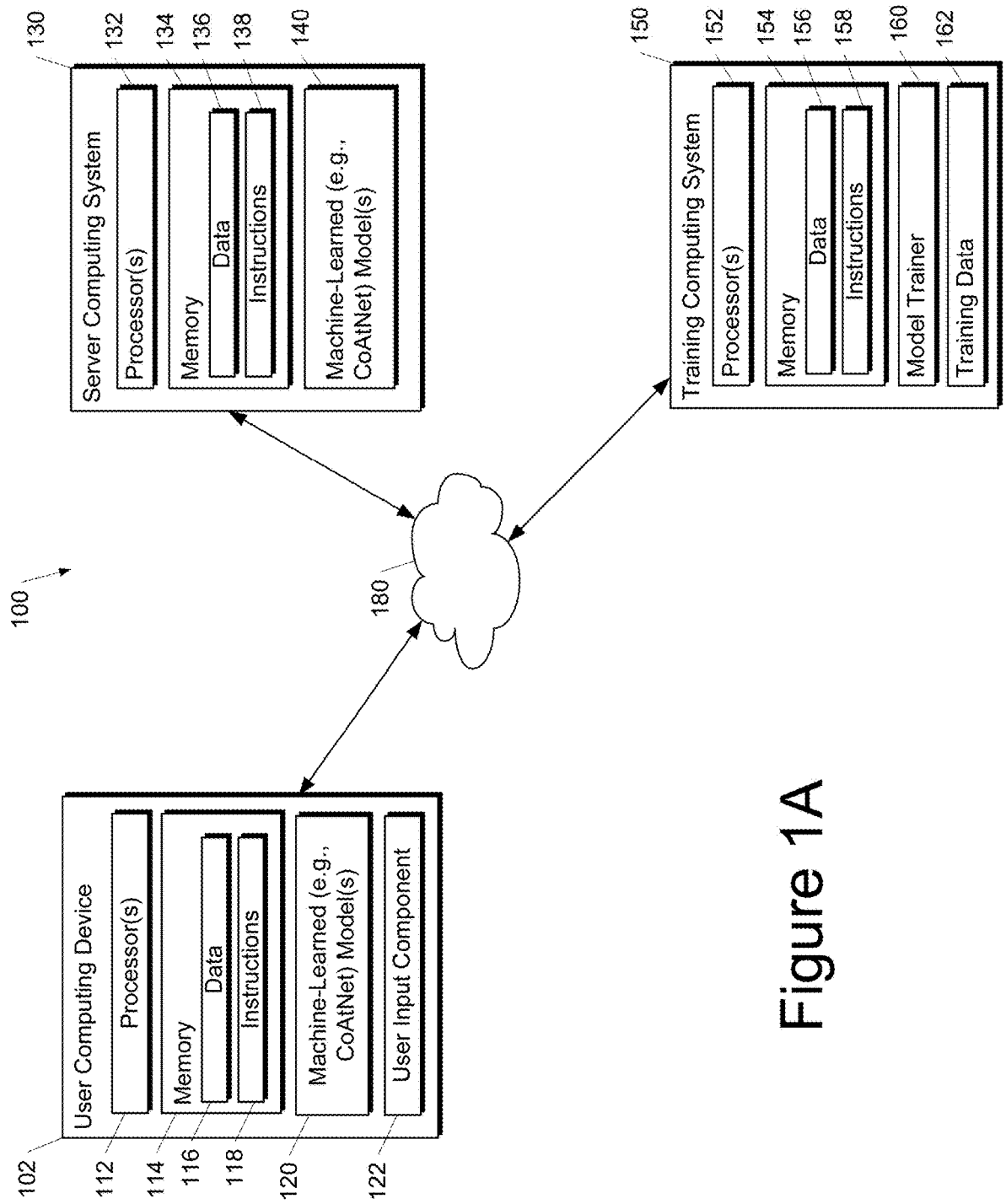
FIG. 1A depicts a block diagram of an example computing system that performs computer vision with reduced computational cost and improved accuracy according to example embodiments of the present disclosure.

Reference numerals that are repeated across plural figures are intended to identify the same features in various implementations.

DETAILED DESCRIPTION

Generally, the present disclosure is directed to systems and methods for machine-learned models having convolution and attention. In particular, systems and methods according to example aspects of the present disclosure can include convolutional blocks and/or attention blocks. According to example aspects of the present disclosure, the attention block(s) can include a relative attention mechanism. In particular, example aspects of the present disclosure recognize that the above-described relative attention can be considered a natural mixture of depthwise convolution and content-based attention. Furthermore, example aspects of the present disclosure recognize that both depthwise convolution and self-attention can be expressed as a weighted sum of values in a receptive field. Thus, the relative attention mechanism can include the sum of a static convolution kernel with an adaptive attention matrix. This sum can be applied prior to and/or subsequent to SoftMax normalization by the relative attention mechanism. As one example, the relative attention mechanism (e.g., applied prior to the SoftMax normalization) may be mathematically represented by:

$$y_i = \sum_{j \in \mathcal{G}} \frac{\exp(x_i^T x_j + w_{i-j})}{\sum_{k \in \mathcal{G}} \exp(x_i^T x_k + w_{i-k})} x_j$$

As another example, the relative attention mechanism (e.g., applied subsequent to the SoftMax normalization) may be mathematically represented by:

$$y_i = \sum_{j \in \mathcal{G}} \left( w_{i-j} + \frac{\exp(x_i^T x_j)}{\sum_{k \in \mathcal{G}} \exp(x_i^T x_k)} \right) x_j$$

In the above equations, the depthwise convolution kernel $w_{i-j}$ is an input-independent parameter of static value for a given index in the input tensor (i,j) (e.g., the relative shift between the indices i–j, where the dependence on the relative shift rather than the specific values is termed translation equivalence, which can improve generalization under datasets of limited size), $x_i$ and $x_j$ are the input and output at position i, respectively, and $\mathcal{G}$ is a global receptive field (e.g., the entire set of positions).

The use of the global receptive field (e.g., as opposed to a limited local receptive field that is traditionally employed in convolutional networks) can provide improved capability of capturing complicated relational interactions between different spatial positions, which can be desirable when processing higher-level concepts. The denominator term can also be referred to as the attention weight, $A_{i,j}$. The attention weight can be decided jointly by the translation equivalence of the depthwise convolution kernel and the input-adaptive input-output pairs, which can provide for both properties to varying degrees, improving generalization, capacity, and/or accuracy of the model.

These attention blocks having relative self-attention can be employed in networks having convolution and attention (termed herein "CoAtNet" models), providing for improved fusion of benefits from convolution and attention. For instance, the models can have robustness to overfitting, lower computational cost, reduced memory usage, and/or smaller parameter size, in addition to high accuracy and efficiency, associated with convolutional networks, while additionally providing the ability to learn complicated relational interactions between spatial positions in input data, associated with transformers.

Systems and methods according to example aspects of the present disclosure (e.g., employing attention blocks having relative attention) can provide for a number of technical effects and benefits, including improvements to computer technology. As one example, systems and methods according to example aspects of the present disclosure can unify convolution and attention to provide improved generalization, model capacity, and/or efficiency. For instance, systems and methods according to example aspects of the present disclosure can more effectively manage a trade-off between improved generalization (e.g., similar to convolutional networks) and improved model capacity (e.g., similar to Transformers). For instance, some example implementations of the present disclosure can achieve state-of-the-art performances under different data sizes and computation budgets.

The improvements provided by the proposed model architecture (e.g., generalization and/or model capacity) can in turn provide for improved accuracy of the model, especially on unseen input data, improved scope of input data type and/or dimension, reduced consumption of computational resources (e.g., faster computation speed, fewer computational cycles, reduced processor or memory usage, etc.), and/or other improvements over existing models. In particular, a model as proposed herein can achieve comparable performance to a state of the art convolutional neural network while having a fewer number of parameters. As one example, an example implementation of a CoAtNet model can achieve comparable top-1 accuracy on the ImageNet dataset with only 40% of the number of parameters and 70% of the FLOPs.

As another example technical effect, the hybrid convolution and attention architectures described herein can enable more efficient usage of specialized hardware such as processors (e.g., graphics processing units) which have been specialized for performing convolution mechanisms and attention mechanism. For example, convolutional stages of the proposed hybrid model can be performed by hardware specialized for convolutional operations while attention stages of the proposed hybrid model can be performed by hardware specialized for attention operations. For example, convolutional operations of the convolutional stages of the proposed hybrid model can be performed in parallel by multiple processors.

Systems and method according to example aspects of the present disclosure can be applied to a variety of machine-learning tasks, especially tasks which conventionally employ convolutional neural networks. As examples, the machine-learning task can be computer vision tasks such as object detection, object recognition, image classification, semantic segmentation, video recognition, video classification, video segmentation, etc. As another example, the machine-learning task can be multi-modality applications such as those involving additional signals (e.g., visual signals) such as, for example, image captioning, video captioning, etc.

With reference now to the Figures, example embodiments of the present disclosure will be discussed in further detail.

FIG. 1A depicts a block diagram of an example computing system 100 that performs computer vision with reduced computational cost and improved accuracy according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 (e.g., CoAtNet models) are discussed with reference to FIGS. 2-3.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel computer vision across multiple instances of CoAtNet models).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a computer vision, such as image classification, service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2-3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, corpuses or other datasets of task-specific training data, such as an image classification database (e.g., ImageNet, JFT 300M, etc.).

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g. one or more image or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
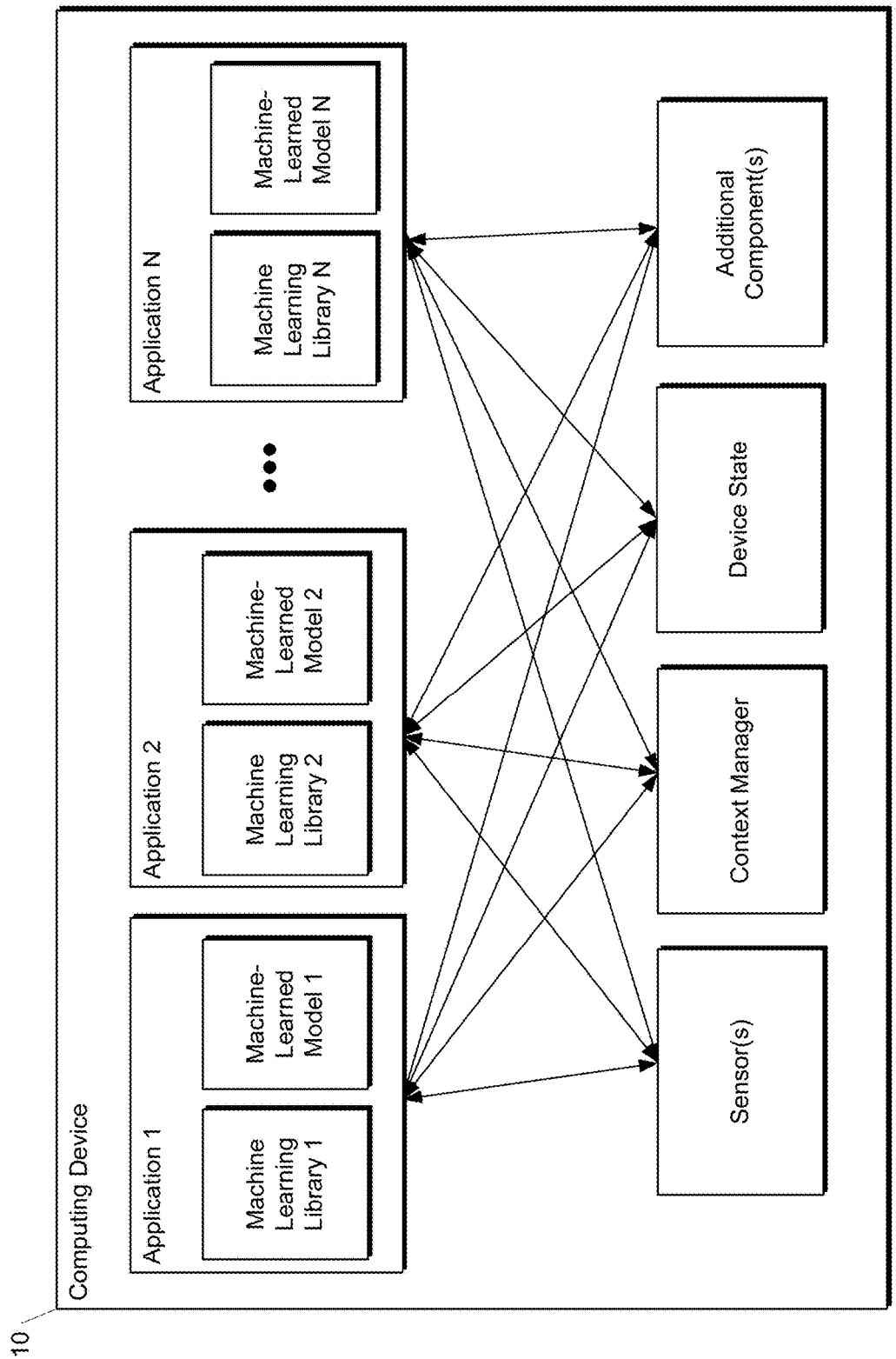
FIG. 1B depicts a block diagram of an example computing device that performs computer vision with reduced computational cost and improved accuracy according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
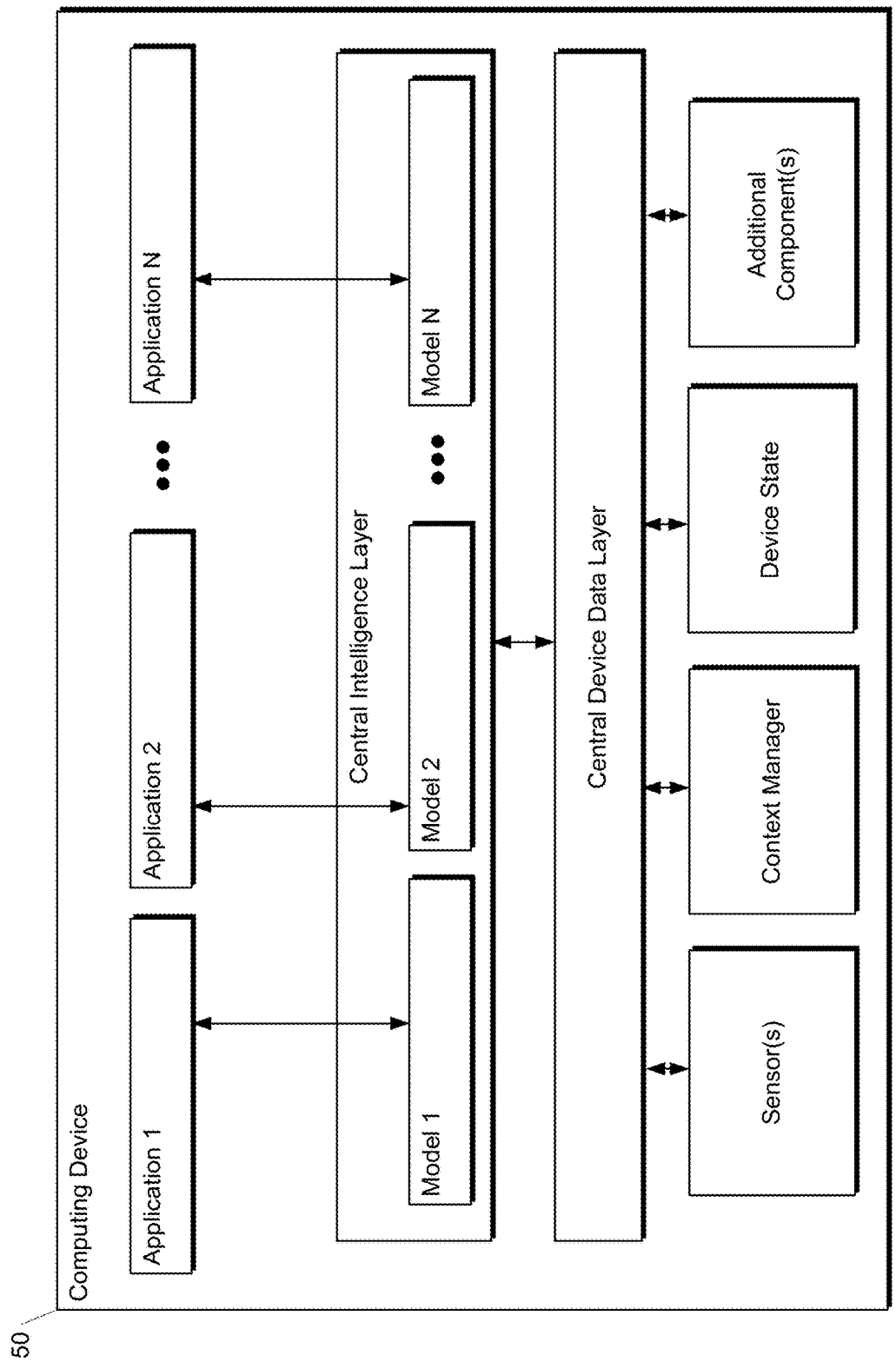
FIG. 1C depicts a block diagram of an example computing device that performs computer vision with reduced computational cost and improved accuracy according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
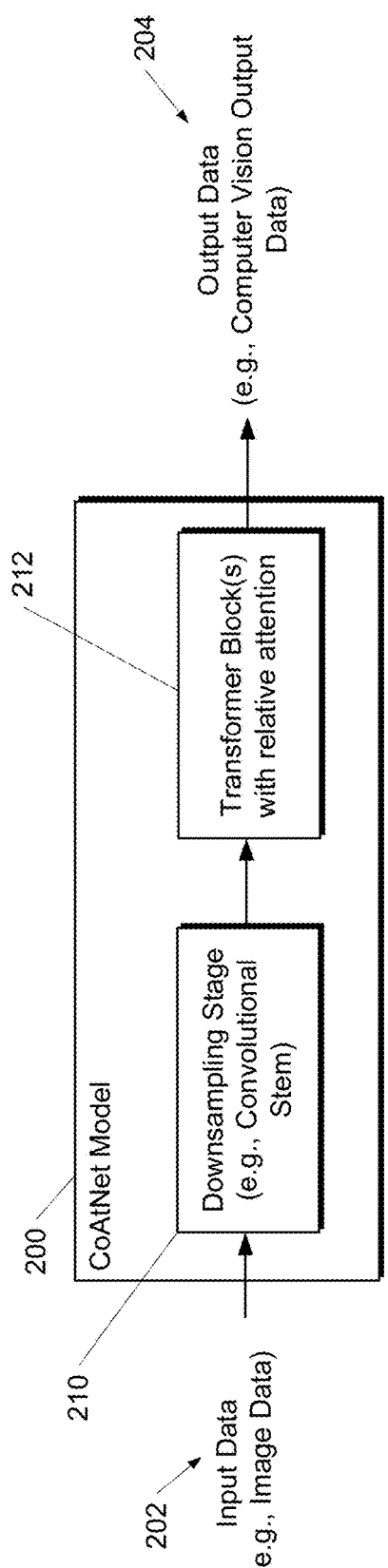
FIG. 2 depicts a block diagram of an example convolution attention network (CoAtNet) model according to example embodiments of the present disclosure.

FIG. 2 depicts a block diagram of an example convolution attention network (CoAtNet) model 200 according to example embodiments of the present disclosure. In some implementations, the model 200 is trained to receive a set of input data 202 descriptive of, for example, image data, or other task-specific input data and, as a result of receipt of the input data 202, provide output data 204 that is responsive to a particular machine-learning task, such as a computer vision task (e.g., image classification).

According to example aspects of the present disclosure, the model 200 can include a downsampling stage 210. The downsampling stage 210 can reduce a spatial resolution of the input data 202. For instance, if the input data 202 comprises a tensor, the downsampling stage 210 may reduce spatial resolution such that the output of the downsampling stage 210 has at least one dimension or resolution that is lower than that of the tensor of the input data 202. Additionally and/or alternatively, the downsampling stage 210 may increase a number of channels relative to the input data. In some implementations, the downsampling stage 210 can be or can include a convolutional stem. The convolutional stem can have aggressive stride, such as a stride of greater than 10.

Additionally and/or alternatively, the model 200 can include one or more attention block(s) 212. The attention block(s) 212 can receive the downsampled input data from downsampling stage 202 and produce the output data 204. The attention block(s) 212 can implement a relative attention mechanism. In some implementations, the attention block(s) 212 can be transformer block(s) which operate similar to Transformer networks.

According to example aspects of the present disclosure, the attention block(s) 212 can include a relative attention mechanism. The relative attention mechanism can include the sum of a static convolution kernel with an adaptive attention matrix. This sum can be applied prior to and/or subsequent to SoftMax normalization by the relative attention mechanism. As one example, the relative attention mechanism (e.g., applied prior to the SoftMax normalization) may be mathematically represented by:

$$y_i = \sum_{j \in \mathcal{G}} \frac{\exp(x_i^T x_j + w_{i-j})}{\sum_{k \in \mathcal{G}} \exp(x_i^T x_k + w_{i-k})} x_j$$

As another example, the relative attention mechanism (e.g., applied subsequent to the SoftMax normalization) may be mathematically represented by:

$$y_i = \sum_{j \in \mathcal{G}} \left( w_{i-j} + \frac{\exp(x_i^T x_j)}{\sum_{k \in \mathcal{G}} \exp(x_i^T x_k)} \right) x_j$$

In the above equations, the depthwise convolution kernel $w_{i-j}$ is an input-independent parameter of static value for a given index in the input tensor (i,j) (e.g., the relative shift between the indices i–j, where the dependence on the relative shift rather than the specific values is termed translation equivalence, which can improve generalization under datasets of limited size), $x_i$ and $x_j$ are the input and output at position i, respectively, and g is a global receptive field (e.g., the entire set of positions).

The use of the global receptive field (e.g., as opposed to a limited local receptive field that is traditionally employed in convolutional networks) can provide improved capability of capturing complicated relational interactions between different spatial positions, which can be desirable when processing higher-level concepts. The denominator term can also be referred to as the attention weight, $A_{i-j}$. The attention weight can be decided jointly by the translation equivalence of the depthwise convolution kernel and the input-adaptive input-output pairs, which can provide for both properties to varying degrees, improving generalization, capacity, and/or accuracy of the model.

Figure 3:
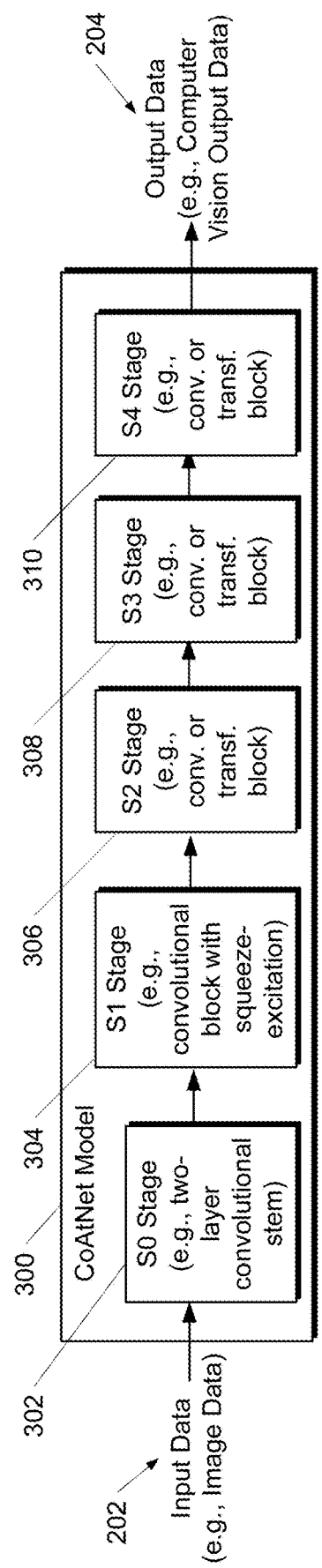
FIG. 3 depicts a block diagram of an example convolution attention network model according to example embodiments of the present disclosure.

FIG. 3 depicts a block diagram of an example convolution attention network (CoAtNet) model 300 according to example embodiments of the present disclosure. In some implementations, the model 300 is trained to receive a set of input data 202 descriptive of, for example, image data, or other task-specific input data and, as a result of receipt of the input data 202, provide output data 204 that is responsive to a particular machine-learning task, such as a computer vision task (e.g., image classification).

The machine-learned convolutional attention network 300 can include two or more network stages (e.g., 302, 304, 306, 308, and 310). Each of the two or more network stages can be or can include one of an attention stage or a convolutional stage such that the convolutional stages are sequentially prior to the attention stages. As one example, in some implementations, the two or more network stages can include an S0 stage 302, an S1 stage 304, an S2 stage 306, an S3 stage 308, and an S4 stage 310. Each of these stages can be a convolutional stage including one or more convolutional blocks (e.g., MBConv blocks) or an attention stage including one or more attention blocks having a relative attention mechanism. As another example, in some implementations, the convolutional blocks can perform depthwise separable convolutions (e.g., over a plurality of channels). Additionally and/or alternatively, in some implementations, the convolutional blocks can perform an inverted bottleneck convolution. In some implementations, a spatial resolution gradually decreases over the two or more network stages. In some implementations, a number of channels can be increased (e.g., doubled) at any of the stages, such as at least one of the S1 stage 304, the S2 stage 306, the S3 stage 308, or the S4 stage 310.

In some implementations, the S0 stage 302 comprises a two-layer convolutional stem network. Additionally and/or alternatively, the S1 stage 304 can include one or more convolutional blocks with squeeze excitation. The one or more convolutional blocks of the S1 stage and/or other convolutional stages can include MBConv blocks. The MBConv blocks can be configured to expand channel size from an original channel size of an input to the one or more convolutional blocks and subsequently project the expanded channel size back to the original channel size. As another example, in some implementations, the convolutional blocks can perform depthwise separable convolutions (e.g., over a plurality of channels). Additionally and/or alternatively, in some implementations, the convolutional blocks can perform an inverted bottleneck convolution. In some implementations, a width of the S0 stage 302 is less than or equal to a width of the S1 stage 304. In some implementations, each of the S0 stage 302, the S1 stage 304, and the S4 stage 310 include (e.g., exactly) two blocks, and the S2 stage 306 and the S3 308 stage each include greater than two blocks. For instance, in one particular implementation, the two or more network stages include an S0 stage 302 comprising a two-layer convolutional stem network, an S1 stage 304 comprising a convolutional block with squeeze-excitation, an S2 stage 306 comprising a convolutional block, an S3 stage 308 comprising a attention block, and an S4 stage 310 comprising a attention block, wherein each of the S3 stage 308 and the S4 stage 310 comprise a relative attention mechanism configured to determine a sum of a static convolution kernel with an adaptive attention matrix.

The attention blocks and/or stage(s) (e.g., the S3 and/or S4 stage(s) 308, 310) can include a relative attention mechanism according to example aspects of the present disclosure. The relative attention mechanism can include the sum of a static convolution kernel with an adaptive attention matrix. This sum can be applied prior to and/or subsequent to SoftMax normalization by the relative attention mechanism. As one example, the relative attention mechanism (e.g., applied prior to the SoftMax normalization) may be mathematically represented by:

$$y_i = \sum_{j \in \mathcal{G}} \frac{\exp(x_i^T x_j + w_{i-j})}{\sum_{k \in \mathcal{G}} \exp(x_i^T x_k + w_{i-k})} x_j$$

As another example, the relative attention mechanism (e.g., applied subsequent to the SoftMax normalization) may be mathematically represented by:

$$y_i = \sum_{j \in \mathcal{G}} \left( w_{i-j} + \frac{\exp(x_i^T x_j)}{\sum_{k \in \mathcal{G}} \exp(x_i^T x_k)} \right) x_j$$

In the above equations, the depthwise convolution kernel $w_{i-j}$ is an input-independent parameter of static value for a given index in the input tensor (i,j) (e.g., the relative shift between the indices i-j, where the dependence on the relative shift rather than the specific values is termed translation equivalence, which can improve generalization under datasets of limited size), $x_i$ and $x_j$ are the input and output at position i, respectively, and g is a global receptive field (e.g., the entire set of positions).

Figure 4:
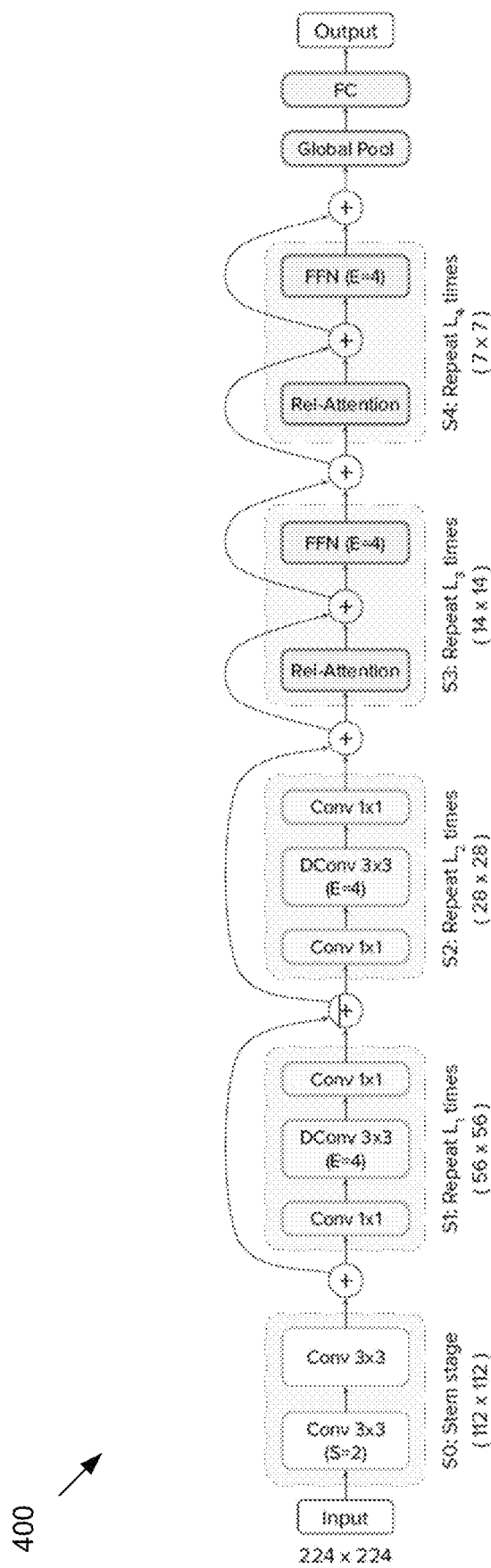
FIG. 4 depicts a block diagram of an example convolution attention network model according to example embodiments of the present disclosure.

FIG. 4 depicts a block diagram of an example convolution attention network (CoAtNet) model 400 according to example embodiments of the present disclosure. As illustrated in FIG. 4, the model 400 can include S0, S1, S2, S3, and S4 stages. For instance, the S0 stage or stem stage can include two (e.g., 3×3) convolutional layers (e.g., with a stride of 2). Additionally, the convolutional S1 stage and S2 stage can each include a 1×1 convolutional layer, a 3×3 deconvolution layer, and a 1×1 convolution layer. Additionally, the attention (e.g., S3 and S4) stages can each include a relative attention mechanism and a feed-forward network. The model can additionally include a global pooling layer and a fully connected layer to produce the model output. Each of the stages can be repeated a designed number of times.

Figure 5:
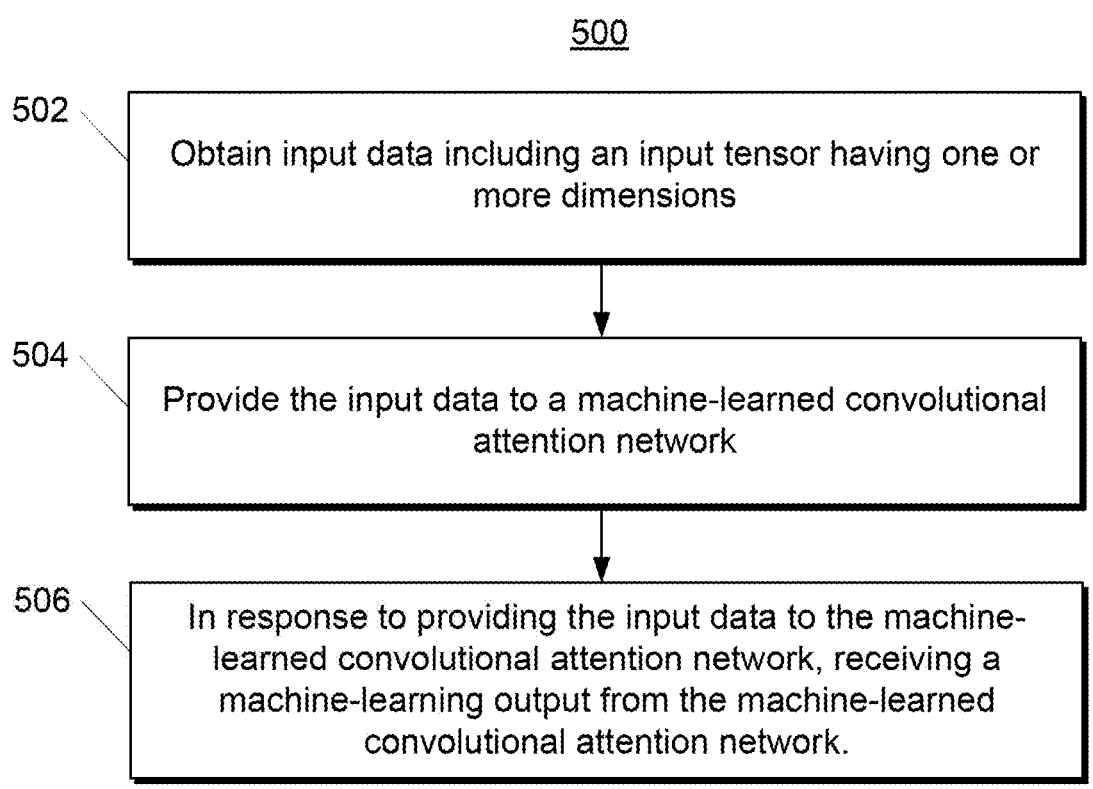
FIG. 5 depicts a flow chart diagram of an example method to perform computer vision with reduced computational cost and improved accuracy according to example embodiments of the present disclosure.

FIG. 5 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

The method 500 can include, at 502, obtaining (e.g., by a computing system including one or more computing devices) input data including an input tensor having one or more dimensions. For instance, the input tensor can be a two-dimensional tensor having a length and/or a width. Additionally and/or alternatively, the input tensor can have one or more channels. In some implementations, for example, the input tensor may be or may include image data such as an image having a length, a width, and/or a plurality of color channels.

The method 500 can include, at 504, providing (e.g., by the computing system) the input data to a machine-learned convolutional attention network. The machine-learned convolutional attention network can be any suitable network according to example aspects of the present disclosure, such as the networks 200 and/or 300 of FIGS. 2 and/or 3.

For instance, in some implementations, the machine-learned convolutional attention network can include two or more network stages, each of the two or more network stages including one of an attention stage or a convolutional stage such that the convolutional stages are sequentially prior to the attention stages. As one example, in some implementations, the two or more network stages can include an S0 stage, an S1 stage, an S2 stage, an S3 stage, and an S4 stage. Each of these stages can be a convolutional stage including one or more convolutional blocks (e.g., MBConv blocks) or an attention stage including one or more attention blocks having a relative attention mechanism. In some implementations, a spatial resolution gradually decreases over the two or more network stages. In some implementations, a number of channels can be increased (e.g., doubled) at any of the stages, such as at least one of the S1 stage, the S2 stage, the S3 stage, or the S4 stage.

In some implementations, the S0 stage comprises a two-layer convolutional stem network. Additionally and/or alternatively, the S1 stage can include one or more convolutional blocks with squeeze excitation. The one or more convolutional blocks of the S1 stage and/or other convolutional stages can include MBConv blocks. The MBConv blocks can be configured to expand channel size from an original channel size of an input to the one or more convolutional blocks and subsequently project the expanded channel size back to the original channel size. As another example, in some implementations, the convolutional blocks can perform depthwise separable convolutions (e.g., over a plurality of channels). Additionally and/or alternatively, in some implementations, the convolutional blocks can perform an inverted bottleneck convolution. In some implementations, a width of the S0 stage is less than or equal to a width of the S1 stage. In some implementations, each of the S0 stage, the S1 stage, and the S5 stage include (e.g., exactly) two blocks, and the S2 stage and the S3 stage each include greater than two blocks. For instance, in one particular implementation, the two or more network stages include an S0 stage comprising a two-layer convolutional stem network, an S1 stage comprising a convolutional block with squeeze-excitation, an S2 stage comprising a convolutional block, an S3 stage comprising a attention block, and an S4 stage comprising a attention block, wherein each of the S3 stage and the S4 stage comprise a relative attention mechanism configured to determine a sum of a static convolution kernel with an adaptive attention matrix.

As another example, in some implementations, the machine-learned convolutional attention network can include a downsampling stage configured to reduce a spatial resolution relative to the input tensor and one or more attention blocks comprising a relative attention mechanism. The downsampling stage can reduce the spatial resolution to improve feasibility of performing computations. For instance, if the input data includes a tensor, the downsampling stage may reduce spatial resolution such that the output of the downsampling stage has at least one dimension or resolution that is lower than that of the tensor of the input data. Additionally and/or alternatively, the downsampling stage may increase a number of channels relative to the input data. In some implementations, the downsampling stage can be or can include a convolutional stem. The convolutional stem can have aggressive stride, such as a stride of greater than 10.

The attention blocks and/or stage(s) (e.g., the S3 and/or S4 stage(s)) can include a relative attention mechanism according to example aspects of the present disclosure. The relative attention mechanism can include the sum of a static convolution kernel with an adaptive attention matrix. This sum can be applied prior to and/or subsequent to SoftMax normalization by the relative attention mechanism. As one example, the relative attention mechanism (e.g., applied prior to the SoftMax normalization) may be mathematically represented by:

$$y_i = \sum_{j \in \mathcal{G}} \frac{\exp(x_i^T x_j + w_{i-j})}{\sum_{k \in \mathcal{G}} \exp(x_i^T x_k + w_{i-k})} x_j$$

As another example, the relative attention mechanism (e.g., applied subsequent to the SoftMax normalization) may be mathematically represented by:

$$y_i = \sum_{j \in \mathcal{G}} \left( w_{i-j} + \frac{\exp(x_i^T x_j)}{\sum_{k \in \mathcal{G}} \exp(x_i^T x_k)} \right) x_j$$

In the above equations, the depthwise convolution kernel $w_{i-j}$ is an input-independent parameter of static value for a given index in the input tensor (i,j) (e.g., the relative shift between the indices i–j, where the dependence on the relative shift rather than the specific values is termed translation equivalence, which can improve generalization under datasets of limited size), $x_i$ and $x_j$ are the input and output at position i, respectively, and g is a global receptive field (e.g., the entire set of positions).

The method 500 can include, at 506, in response to providing the input data to the machine-learned convolutional attention network, receiving, by the computing system, a machine-learning prediction from the machine-learned convolutional attention network. The machine-learning prediction can be a task-specific machine-learning prediction. As an example, the output can be a computer vision output, such as a classification output (e.g., classification vector), object recognition output, etc. Alternatively, the machine-learning prediction can be an intermediate prediction or representation such as an embedding in a latent or learned space.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for performing computer vision with reduced computational cost and improved accuracy, the computer-implemented method comprising:
   obtaining, by a computing system comprising one or more computing devices, input data comprising an input tensor having one or more dimensions;
   providing, by the computing system, the input data to a machine-learned convolutional attention network, the machine-learned convolutional attention network comprising two or more network stages, the two or more network stages comprising one or more attention stages and one or more convolutional stages, wherein at least one of the one or more attention stages comprises a relative attention mechanism that is configured to perform a Softmax normalization and apply, either prior to or subsequent to performing the Softmax normalization, a sum of a static convolution kernel with an adaptive attention matrix; and in response to providing the input data to the machine-learned convolutional attention network, receiving, by the computing system, a machine-learning prediction from the machine-learned convolutional attention network.

2. The computer-implemented method of claim 1, wherein the two or more network stages comprise an S0 stage, an S1 stage, an S2 stage, an S3 stage, and an S4 stage.

3. The computer-implemented method of claim 2, wherein the S0 stage comprises a two-layer convolutional stem network.

4. The computer-implemented method of claim 2, wherein the S1 stage comprises one or more convolutional blocks with squeeze excitation.

5. The computer-implemented method of claim 4, wherein the one or more convolutional blocks of the S1 stage comprise mobile inverted bottleneck convolution (MBConv) blocks, the MBConv blocks configured to expand channel size from an original channel size of an input to the one or more convolutional blocks and subsequently project the expanded channel size back to the original channel size.

6. The computer-implemented method of claim 2, wherein each of the S2 stage, S3 stage, or S4 stage comprising a convolutional stage comprise a mobile inverted bottleneck convolution (MBConv) block.

7. The computer-implemented method of claim 2, wherein a number of channels is doubled for at least one of the S1 stage, the S2 stage, the S3 stage, or the S4 stage.

8. The computer-implemented method of claim 2, wherein a width of the S0 stage is less than or equal to a width of the S1 stage.

9. The computer-implemented method of claim 2, wherein each of the S0 stage, the S1 stage, and the S4 stage comprises two blocks, and wherein the S2 stage and the S3 stage each comprise greater than two blocks.

10. The computer-implemented method of claim 1, wherein a spatial resolution gradually decreases over the two or more network stages.

11. The computer-implemented method of claim 1, wherein the sum of the static convolution kernel with the adaptive attention matrix is applied to the input data prior to performing the SoftMax normalization by the relative attention mechanism.

12. The computer-implemented method of claim 1, wherein the sum of the static convolution kernel with the adaptive attention matrix is applied to the input data subsequent to performing the SoftMax normalization by the relative attention mechanism.

13. The computer-implemented method of claim 1, wherein the machine-learning prediction comprises a computer vision output.

14. The computer-implemented method of claim 1, wherein the machine-learning prediction comprises a classification output.

15. The computer-implemented method of claim 1, wherein the one or more convolutional stages are sequentially prior to the one or more attention stages in the two or more network stages.

16. A computer-implemented method for performing computer vision with reduced computational cost and improved accuracy, the computer-implemented method comprising:

obtaining, by a computing system comprising one or more computing devices, input data comprising an input tensor having one or more dimensions;

providing, by the computing system, the input data to a machine-learned convolutional attention network, the machine-learned convolutional attention network comprising:

a downsampling stage configured to reduce a spatial resolution relative to the input tensor; and one or more attention blocks comprising a relative attention mechanism that is configured to perform a Softmax normalization and apply, either prior to or subsequent to performing the Softmax normalization, a sum of a static convolution kernel with an adaptive attention matrix in response to providing the input data to the machine-learned convolutional attention network, receiving, by the computing system, a machine-learning prediction from the machine-learned convolutional attention network.

17. The computer-implemented method of claim 16, wherein the downsampling stage comprises a convolution stem.

18. The computer-implemented method of claim 16, wherein the sum of the static convolution kernel with the adaptive attention matrix is applied to the input data subsequent to performing the SoftMax normalization by the relative attention mechanism.

19. The computer-implemented method of claim 16, wherein the sum of the static convolution kernel with the adaptive attention matrix is applied to the input data prior to performing the SoftMax normalization by the relative attention mechanism.

20. A computer-implemented method for performing computer vision with reduced computational cost and improved accuracy, the method comprising:

obtaining, by a computing system comprising one or more computing devices, input data comprising an input tensor having one or more dimensions;

providing, by the computing system, the input data to a machine-learned convolutional attention network, the machine-learned convolutional attention network comprising a plurality of network stages, the plurality of network stages comprising:

an S0 stage comprising a two-layer convolutional stem network;

an S1 stage comprising a convolutional block with squeeze-excitation;

an S2 stage comprising a convolutional block;

an S3 stage comprising an attention block;

an S4 stage comprising an attention block; and wherein each of the S3 stage and the S4 stage comprise a relative attention mechanism configured to determine a sum of a static convolution kernel with an adaptive attention matrix;

wherein spatial resolution is decreased at each of the plurality of network stages;

wherein a number of channels is increased at each of the plurality of network stages; and in response to providing the input data to the machine-learned convolutional attention network, receiving, by the computing system, a machine-learning prediction from the machine-learned convolutional attention network.

21. The computer-implemented method of claim 20, wherein the sum of the static convolution kernel with the adaptive attention matrix is applied to the input data subsequent to performing the SoftMax normalization by the relative attention mechanism.

22. The computer-implemented method of claim 20, wherein the sum of the static convolution kernel with the adaptive attention matrix is applied to the input data prior to performing the SoftMax normalization b the relative attention mechanism.

* * * * *